July 24, 1962 R. E. RISLEY 3,045,511
SERVICE T

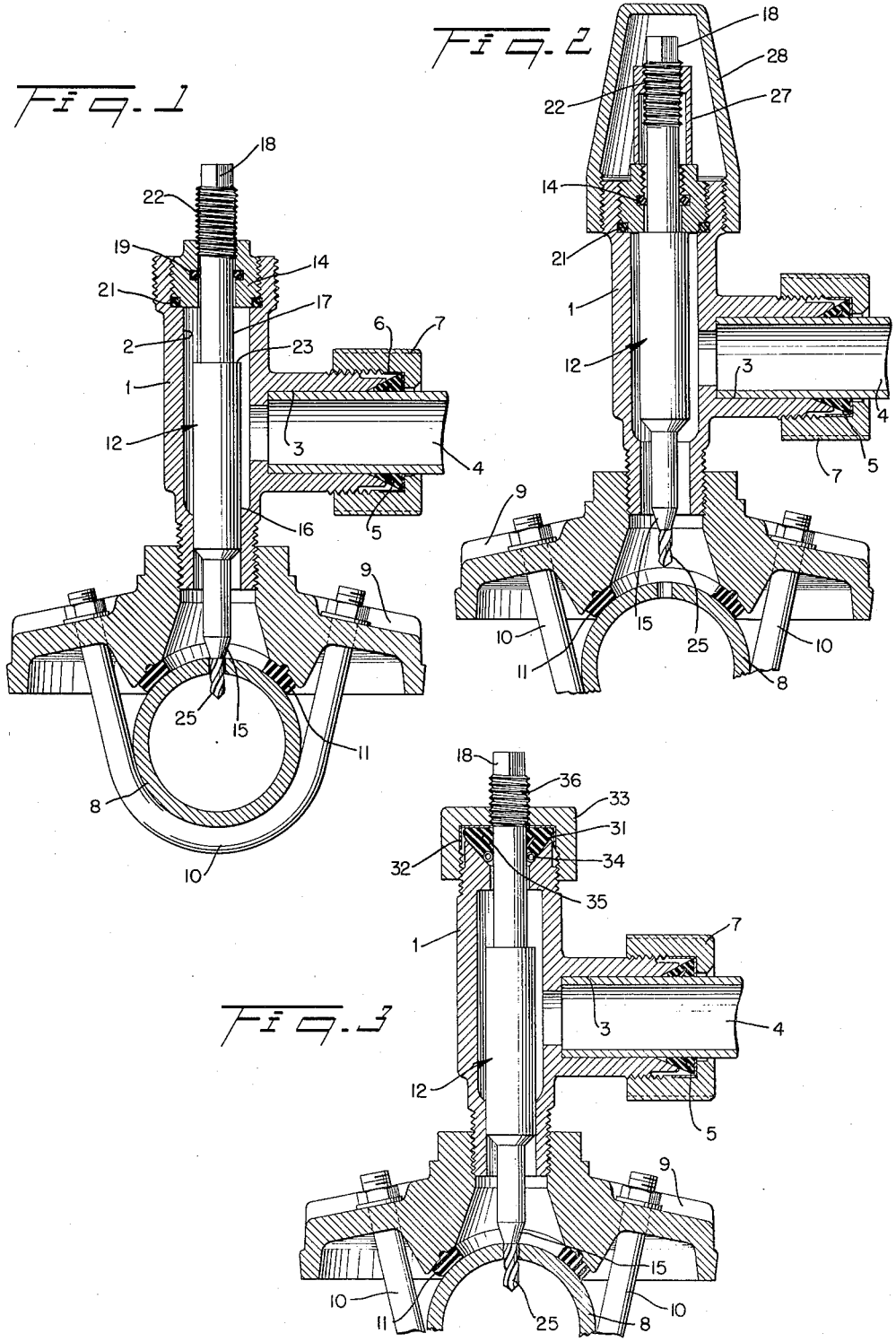

Filed March 18, 1959 2 Sheets-Sheet 2

United States Patent Office 3,045,511
Patented July 24, 1962

3,045,511
SERVICE T
Roger E. Risley, Bradford, Pa., assignor to Dresser Industries, Inc., Dallas, Tex., a corporation of Delaware
Filed Mar. 18, 1959, Ser. No. 800,135
4 Claims. (Cl. 77—38)

The present invention relates to pipe fittings for connecting a service line to an existing main. While fittings in accordance with the invention are applicable to service lines in general, they are particularly useful in connection with gas service lines and will hence be described with reference to gas distribution systems.

When a new residence or other building is erected on a street having an existing gas main, it is necessary to provide a service line for the new building and to connect the service line with the main. Moreover, it is desirable to make the connection without interrupting service to other buildings already served by the main. This has been done by clamping or welding a T to the main with its axial bore perpendicular to the main, connecting the lateral bore of the T to the new service line, inserting a drill in the axial bore to drill a hole through the wall of the main, withdrawing the drill and plugging or capping the upper end of the T. However, with this operation it is difficult to avoid the escape of a considerable amount of gas which is injurious to the workmen and creates the danger of a serious explosion. Various valve arrangements and other devices have been proposed for avoiding gas leakage but such expedients are expensive and have not been found wholly satisfactory.

The present invention is directed to a different approach in which a drill is incorporated in the fitting as a permanent part and is not removed. The difficulty of preventing gas leakage during removal of the drill is thus avoided. As the drill is intended for a single use, it can be quite inexpensive and does not materially increase the cost of the fitting. In fact, the drill is less expensive than valve arrangements heretofore used. Moreover, the fittings in accordance with the invention provide important savings of labor in installation and improved safety conditions.

The characteristics, objects and advantages of the invention will be more fully understood from the following description and claims in conjunction with the accompanying drawings which show preferred embodiments of the invention and in which:

FIG. 1 is a vertical section of a fitting in accordance with the invention positioned on a main and connected to a service line, the drill being shown in operative position.

FIG. 2 is a section similar to FIG. 1 but with the drill shown in retracted position.

FIG. 3 is a sectional view similar to FIG. 1 but showing a modification.

Figure 4:
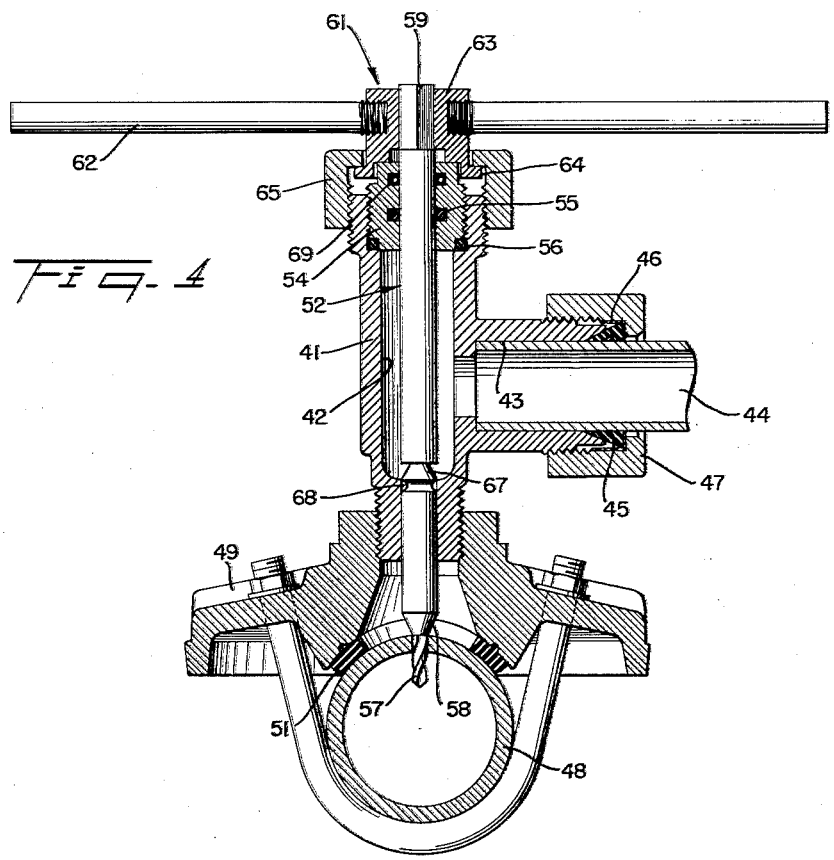
FIG. 4 is a sectional view similar to FIG. 1 and showing a further embodiment of the invention.

The embodiment of the invention illustrated by way of example in FIGS. 1 and 2 comprises a T-shaped body portion 1 having an axial bore 2 and a passageway 3 opening laterally off of the axial bore. A service line 4 is connected to the lateral passageway 3, for example by means of a gasket 5, retainer cup 6 and follower nut 7 providing a fluidtight connection. Means is also provided for connecting the lower end of the casing 1 to the wall of a main 8 with a fluidtight connection. While the casing may, if desired, be welded or otherwise secured to the main, it is shown as being threaded and screwed into a saddle 9 which is clamped onto the main, for example by U-bolts 10, with a gasket 11 providing a fluidtight connection.

The axial bore 2 of the casing 1 is on a line which intersects and is preferably perpendicular to the main 8 and comprises a cylindrical lower portion, an enlarged intermediate portion and a threaded upper portion. A drill stem 12 is received in the axial bore 2 and is retained by a bushing 14 screwed into the upper threaded end portion of the bore. The drill stem 12 has a tapered lower portion 15, a cylindrical bearing portion 16 which is rotatable and axially slidable in the lower cylindrical portion of the bore 2 and an upper cylindrical portion 17 which extends up through the bushing 14 and terminates in a square end 18. O-rings 19 and 21 provide a fluidtight seal between the stem 12 and the upper portion of the casing. The upper end of the stem 12 is threaded as indicated at 22 for a short distance below the square portion 18 and is adapted to engage mating threads provided in the upper portion of the bushing 14. It will be seen that the stem 12 is rotatable and is also axially slidable in the axial bore of the casing 1. However, axial movement in a downward direction is limited by the threads 22 and axial movement in an upward direction is limited by the engagement of a shoulder 23 on the stem with the bushing 14 so that the stem is permanently retained in the casing.

On the lower end of the stem 12 there is provided a rotary drill bit 25 which is preferably integral with the stem or otherwise permanently fixed on it. The drill bit 25 is relatively short, having a length slightly greater than the thickness of the wall of the main 8. The drill bit may, for example have cutting edges like those of a metal twist drill and is sufficiently hardened to cut the wall of the main. However, as the drill is intended to be used only once, it can be made of relatively inexpensive material.

After the T has been affixed to a main and preferably after the service line 4 has been connected, the stem 12 is pressed downwardly to bring the drill bit into engagement with the wall of the main and is rotated to drill a hole through the main wall. Rotation of the stem is effected by a suitable wrench or power drive fitting onto the square end 18 of the stem. If it is desired to close the hole in the main temporarily after it has been completed, the threaded portion 22 of the stem is screwed into the threaded upper portion of the bushing to force the tapered portion 15 of the stem into the hole thereby providing a fluidtight closure. This may be desired for example if the service connection of the building has not yet been completed. When the building is ready to be put into service, the stem 12 is retracted to the position shown in FIG. 2 and is held in retracted position by a sleeve 27 which slips over the projecting portion of the stem into engagement with the bushing 14 and has a threaded upper end portion adapted to screw onto the threaded portion 22 of the stem. With the stem 12 in its retracted position, gas or other fluid is permitted to flow from the main 8 through the hole drilled in the wall of the main, the bore 2 of the casing and the lateral passageway 3 into the service 4. A cup-shaped cap 28 is preferably screwed onto the upper end of the casing 1 to enclose and protect the projecting upper end portion of the stem.

If at any subsequent time it is desired to close off the service, for example to make repairs, the cap 28 and sleeve 27 are unscrewed and removed and the stem 12 is moved downwardly to bring the tapered portion 15 into engagement with the periphery of the hole in the main to provide a closure for the hole as described above.

The embodiment of the invention shown in FIG. 3 is similar to that of FIGS. 1 and 2. As many of the parts are the same they are designated by the same reference numerals and the description of such parts will not be repeated. Instead of being internally threaded to receive a bushing, the upper end portion of the casing 2 is shaped to receive a gasket 31 and retainer cup 32 and is externally threaded for a follower nut 33. The gasket 31 is formed of a rubber composition or other elastomer material. A coiled wire reinforcement 34 with substantially contiguous convolutions is embedded in the nose portion of the gasket 31 and prevents flow of gasket material through the clearance space between the stem 12 and the upper end portion of the casing. A thin annular integral lip 35 provided on the inside of the gasket and projecting slightly inwardly when in free condition provides an initial fluid-tight seal substantially without gasket pressure. The inner annular edge of the radial flange portion of the follow nut 33 is threaded as indicated at 36 to receive the threaded portion 22 of the stem 12.

With the modifications shown in FIG. 3 the gasket follower nut 33 is initially screwed down lightly to provide a substantially fluidtight seal while still leaving the stem 12 rotatable and axially slidable. After a hole has been drilled in the main and the stem 12 has been retracted to its upper position as described above, the follower nut 33 is tightened to provide a permanent seal. When the follower nut has been tightened, the engagement of the gasket with the stem 12 is sufficient to hold it securely in retracted position so that the sleeve 27 need not be used.

Figure 5:
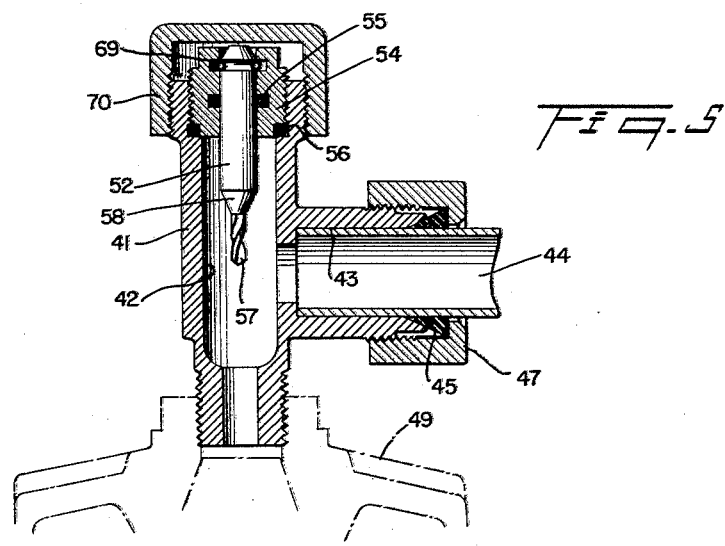
FIG. 5 is a sectional view similar to FIG. 4 but with the drill shown in retracted position.

The embodiment of the invention shown in FIGS. 4 and 5 is similar to that of FIGS. 1 and 2 and comprises a T-shaped body or casing 41 having an axial bore 42 and a passageway 43 opening laterally off of the axial bore. A service line 44 is connected to the lateral passageway by a fluidtight connection provided by a gasket 45, retainer cup 46 and follower nut 47. The lower end of the T-shaped body is shown connected to a main 48 by means of a saddle 49 having a gasket 51.

A substantially cylindrical stem 52 is received in the bore 42 of the casing and extends up through a bushing 54 that is screwed into the threaded upper end portion of the bore 42. O-ring seals 55 and 56 provide a fluidtight seal between the stem 52 and the upper portion of the casing. At its lower end the stem 52 carries a rotary drill bit 57 and has a tapered portion 58 above the drill bit. At its upper end, the stem is provided with a square portion 59 to receive a wrench 61 for rotating the stem and drill bit. The wrench is shown as having handle portions 62 radiating from a central socket portion 63 which fits over the square end of the stem 52 and has a projecting flange portion 64 that is engaged by a feed collar 65 which screws onto an externally threaded upper end portion of the casing 41 to force the drill bit 57 into cutting engagement with the wall of the main 48 as the stem is rotated.

Intermediate its ends the stem 52 is weakened by an annular groove 67 to provide a breakline. A short distance below the groove 67 there is provided a shallower annular groove 68. A snap ring 69 is seated in an annular groove in the bushing 54 and surrounds the stem 52.

The fitting shown in FIGS. 4 and 5 is installed in substantially the same manner as those of FIGS. 1 to 3. The feed collar 65 is progressively screwed down to feed the drill bit during the drilling operation. After the drilling of a hole through the wall of the main has been completed, the feed collar 65 and at least the socket portion 63 of the wrench may be left in position to hold the tapered lower end portion 58 of the stem 52 in engagement with the periphery of the hole to provide an interim closure for the hole. When it is desired to open service, the feed collar and wrench are removed and the stem 52 is drawn upwardly until the ring 69 snaps into the groove 68 thereby locking the stem in its retracted position. It will be noted that the lower side of the groove 67 is tapered so as to permit the groove 67 to pass the snap ring. The upper portion of the stem is then broken off and a cap 70 is screwed onto the upper end portion of the casing as shown in FIG. 5. With the stem 52 locked in its upper position, gas or other fluid can flow freely through the T to the service line. The lower end portion 52 of the stem remains permanently in the bushing 54 to provide a fluid-tight closure for the upper end of the T.

It will thus be seen that the invention provides a convenient, inexpensive and safe fitting for connecting a new service to an existing main. It will be understood that the invention is in no way limited to the preferred embodiments shown by way of example in the drawings and particularly described. The terms "upper" and "lower" as used in the description and claims refer to the parts when in the position shown in the drawings but are not used in a limiting sense since the fitting may be in any desired position. The individual features of the several embodiments are mutually interchangeable. For example, the drill feeding arrangement shown in FIG. 4 is applicable to the embodiment of FIGS. 1 and 2. Other modifications may be made as desired without departing from the present invention as defined by the appended claims.

What I claim and desire to secure by Letters Patent is:

1. A fitting for connecting a service line to an existing main, comprising a casing having a bore having cylindrical portions and extending through said casing and having upper and lower ends, said bore having an enlarged intermediate portion, said casing having a fluid passageway opening laterally off of said intermediate portion, means for making a fluid-tight connection between said passageway and said service line, said lower end of said casing having a surface corresponding generally to the curvature of the existing main, and flexible gasket means carried by said lower end for making a fluid-tight connection between the lower end of said casing and said main with said bore inetrsecting the main, said last-named means including holding means adapted to extend around said existing main and to engage with said lower end of said casing, a stem extending through said bore and having cylindrical portions rotatably and axially slidably bearing in said cylindrical portions of said bore to provide for rotational and axial movement of said stem in said bore without threaded engagement therewith, means limiting axial movement of said stem to retain it in said bore, a closure member threadedly engaging with the upper end of said casing and having a threaded axial passageway, the upper end portion of said stem having threads for engagement in said passageway, said upper end portion of said stem projecting above the upper end of said casing, means comprising a flexible gasket element providing a fluid-tight seal between the upper portion of said casing and said stem, a rotary drill bit on the lower end of said stem in position to engage the wall of said main, means on the projecting upper end portion of said stem for rotating said stem and drill bit to drill a hole through said main wall, said stem being axially slidable to retract said cylindrical portion of said stem from the lower cylindrical portion of said bore to permit flow of fluid from said main through said hole, bore and passageway to said service line, and means for locking said stem in said retracted position.

2. A fitting according to claim 1, wherein said means for limiting axial movement of said stem comprises a shoulder on said stem disposed in the enlarged intermediate portion of said bore, said shoulder having an outer diameter greater than the threaded passageway in said closure member.

3. A fitting for connecting a service line to an existing main, comprising a casing having a bore extending therethrough and having upper and lower ends, said casing having a fluid passageway opening laterally off of said bore intermediate its ends, means for making a fluid-tight connection between said passageway and said service line, said lower end of said casing having a surface corresponding generally to the curvature of the existing main, and flexible gasket means carried by said lower end for making a fluid-tight connection between the lower end of said casing and said main with said bore intersecting the main, said last-named means including holding means adapted to extend around said existing main and to engage with said lower end, a stem extending through said bore and having upper and lower cylindrical portions rotatably and axially slidably bearing in said bore to provide for rotational and axial movement of said stem in said bore without threaded engagement therewith, means for permanently retaining said stem in said bore, means comprising a flexible gasket element providing a fluid-tight seal between the upper cylindrical portion of said stem and the upper portion of the casing, said stem having an upper end portion projecting above the upper end of the casing, a rotary drill bit on the lower end of said stem in position to engage the wall of said main, said drill being of smaller diameter than the lower cylindrical portion of the stem, said stem having a portion tapering downwardly from said lower cylindrical portion to said drill bit, means on the projecting upper end portion of the said stem for rotating said stem and drill bit to drill a hole through said main wall, means for pressing said tapered stem portion into engagement with the periphery of said hole to close said hole, said last-named means comprising a closure member threadedly engaging with the upper end of said casing, said stem being retractable axially to open said hole and permit flow of fluid from the main through said hole, bore and passageway to said service line, and means for retaining said stem in retracted position.

4. A fitting according to claim 3, wherein said means for retaining said stem in retracted position comprises an annular groove in said stem and a snap ring received in an annular recess in said bore in position to engage in said groove when the stem has been retracted.

References Cited in the file of this patent
UNITED STATES PATENTS

| | | |
|---|---|---|
| 2,334,363 | Vann | Nov. 16, 1943 |
| 2,608,989 | McDonald | Sept. 2, 1952 |
| 2,660,192 | Hunter | Nov. 24, 1953 |
| 2,736,335 | Webber | Feb. 28, 1956 |
| 2,745,669 | Mueller et al. | May 15, 1956 |
| 2,875,777 | Lacart | Mar. 3, 1959 |